Figure 4:
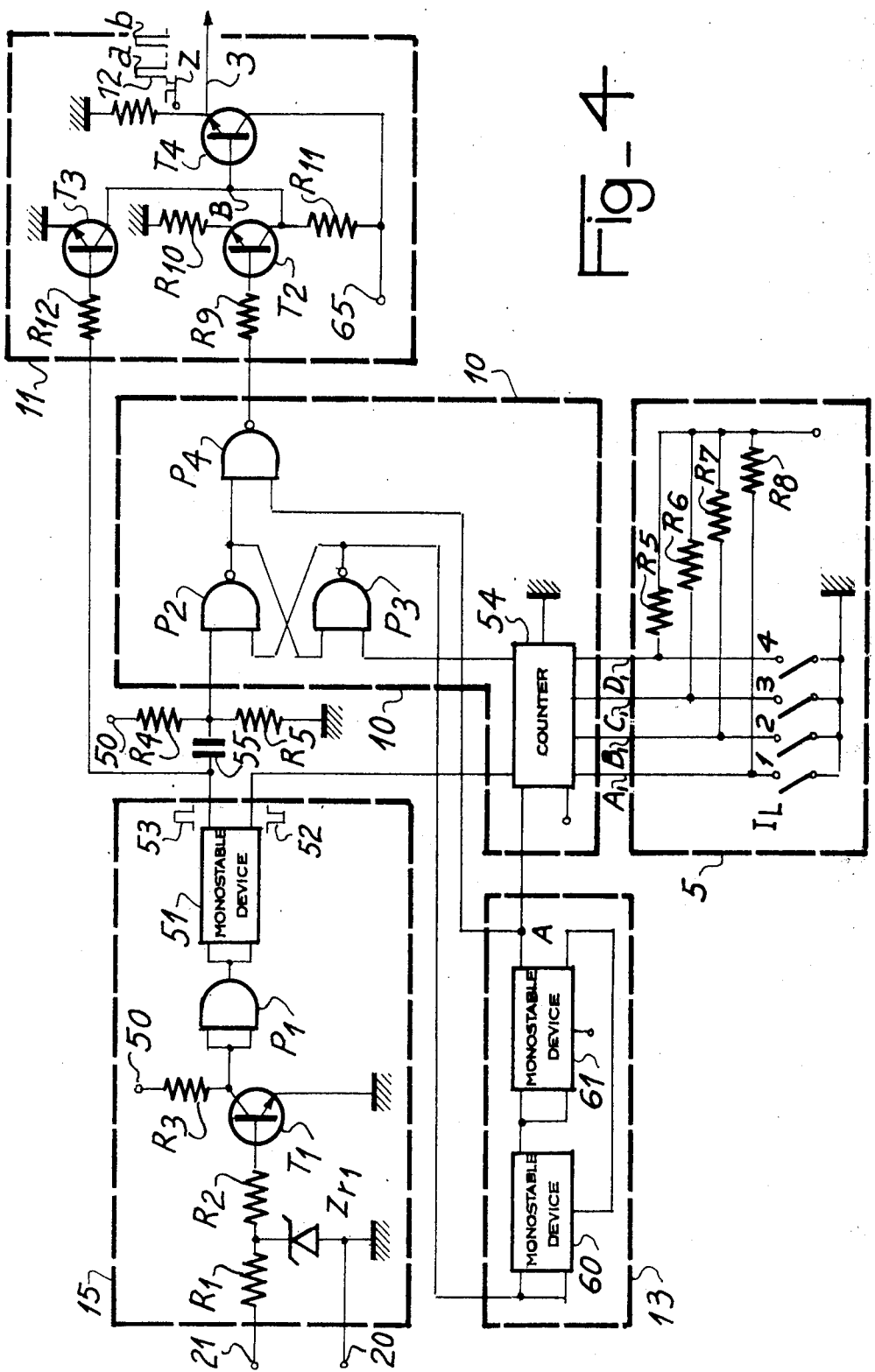

United States Patent [19]

Tchang

[11] 4,283,636
[45] Aug. 11, 1981

[54] ELECTRONICALLY CONTROLLED POWER SUPPLY RAIL

[75] Inventor: Liang-ing Tchang, Paris, France

[73] Assignee: LITA, Paris, France

[21] Appl. No.: 961,857

[22] Filed: Nov. 17, 1978

[30] Foreign Application Priority Data

Nov. 22, 1977 [FR] France .................................. 77 35044

[51] Int. Cl.³ .......................................... H04Q 11/00
[52] U.S. Cl. ...................................... 307/38; 315/318; 340/168 B
[58] Field of Search ................. 307/11, 12, 29, 38–41, 307/42, 252 B; 318/103, 112; 315/313, 317, 320, 318, 319; 340/168 R, 163, 147 R, 168 A, 168 B, 168 CC, 168 S, 168 C

[56] References Cited
U.S. PATENT DOCUMENTS

| 3,634,826 | 1/1972 | Biedermann et al. | 340/167 R |
| 3,740,582 | 6/1973 | McCusker et al. | 307/252 B |
| 3,943,489 | 3/1976 | Brewster et al. | 340/147 SY |
| 4,085,403 | 4/1978 | Meier et al. | 340/168 R |

Primary Examiner—L. T. Hix
Assistant Examiner—W. J. Brady
Attorney, Agent, or Firm—Cushman, Darby & Cushman

[57] ABSTRACT

An electronically controlled power supply rail provided with only three conductors, such a rail enables a number n of utilization channels to be supplied, and this to be independently of one another, comprising a transmitter positioned at the end of the rail which emits, as a function of the instructions which are given, a control signal which is transmitted by one of the three conductors to a plurality of receivers associated with each of the channels, each receiver couverting said control signal into a triggering signal capable of selectively actuating a power switching-member, thus causing a supply to be applied to the utilization channel selected.

9 Claims, 7 Drawing Figures

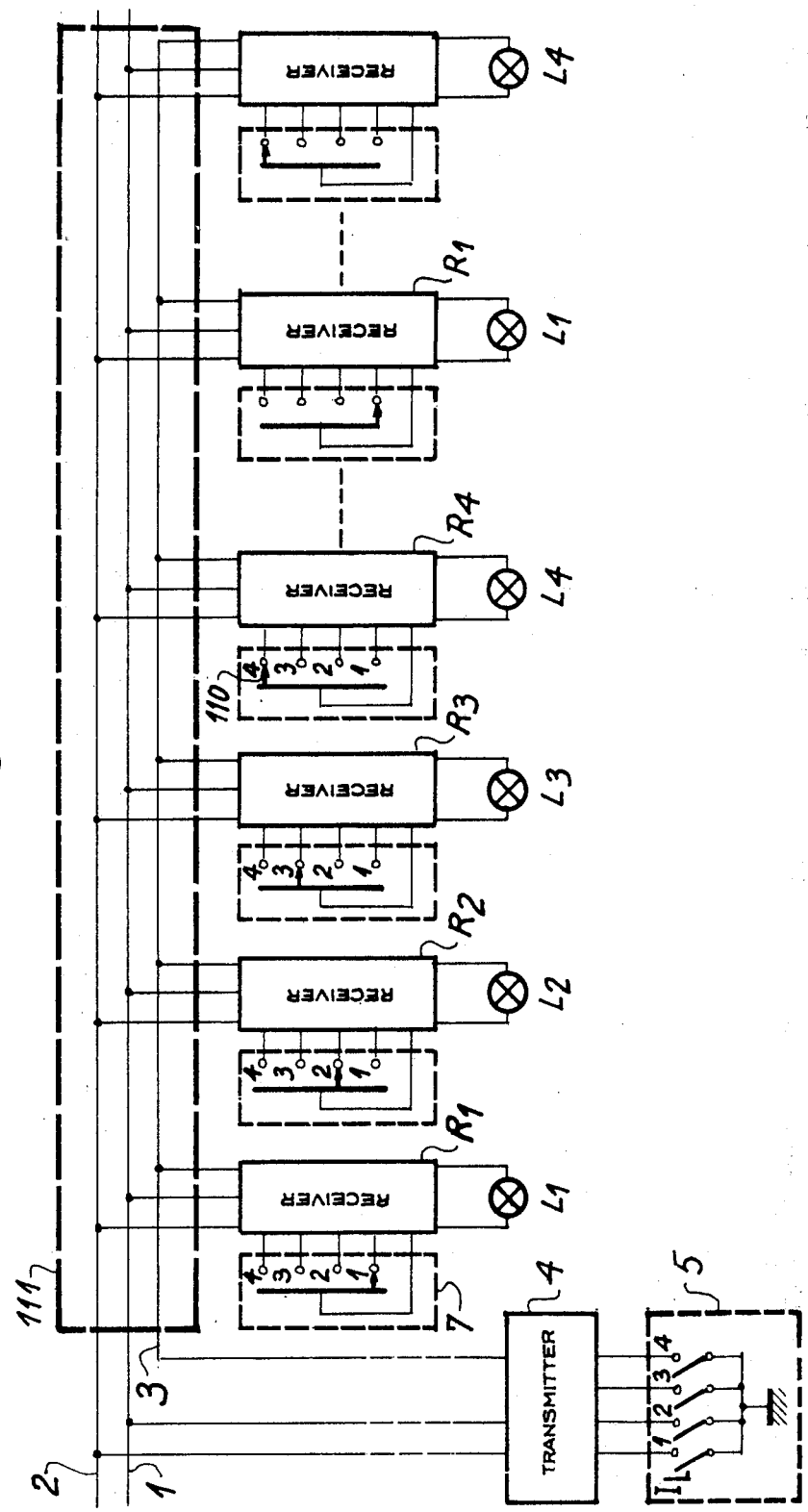

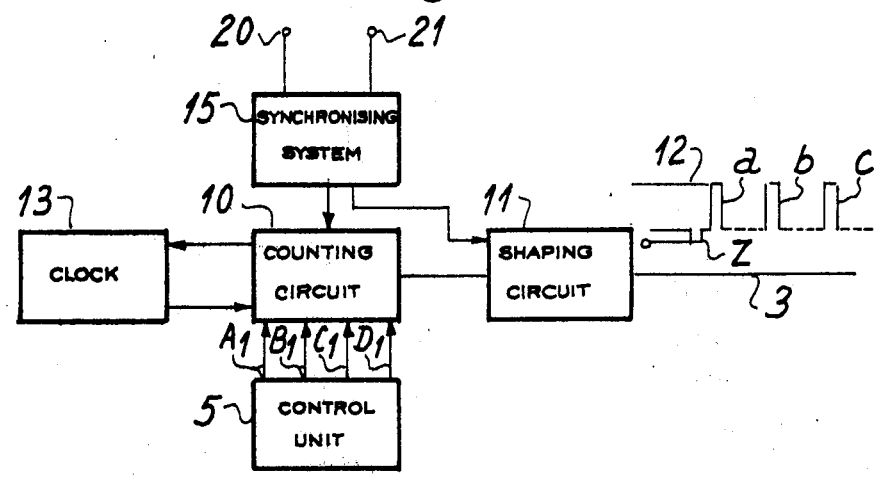
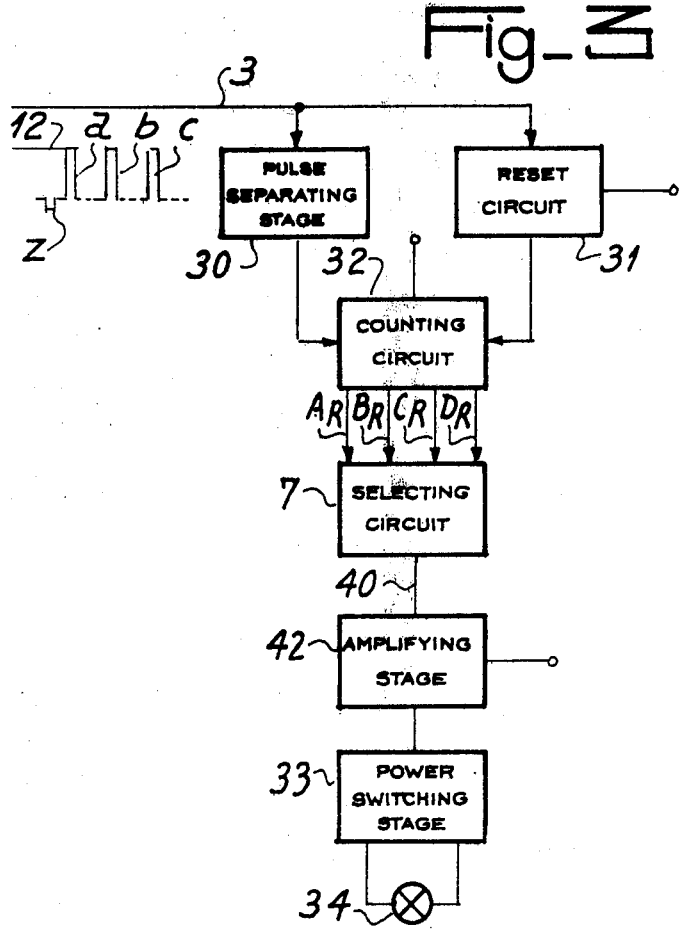

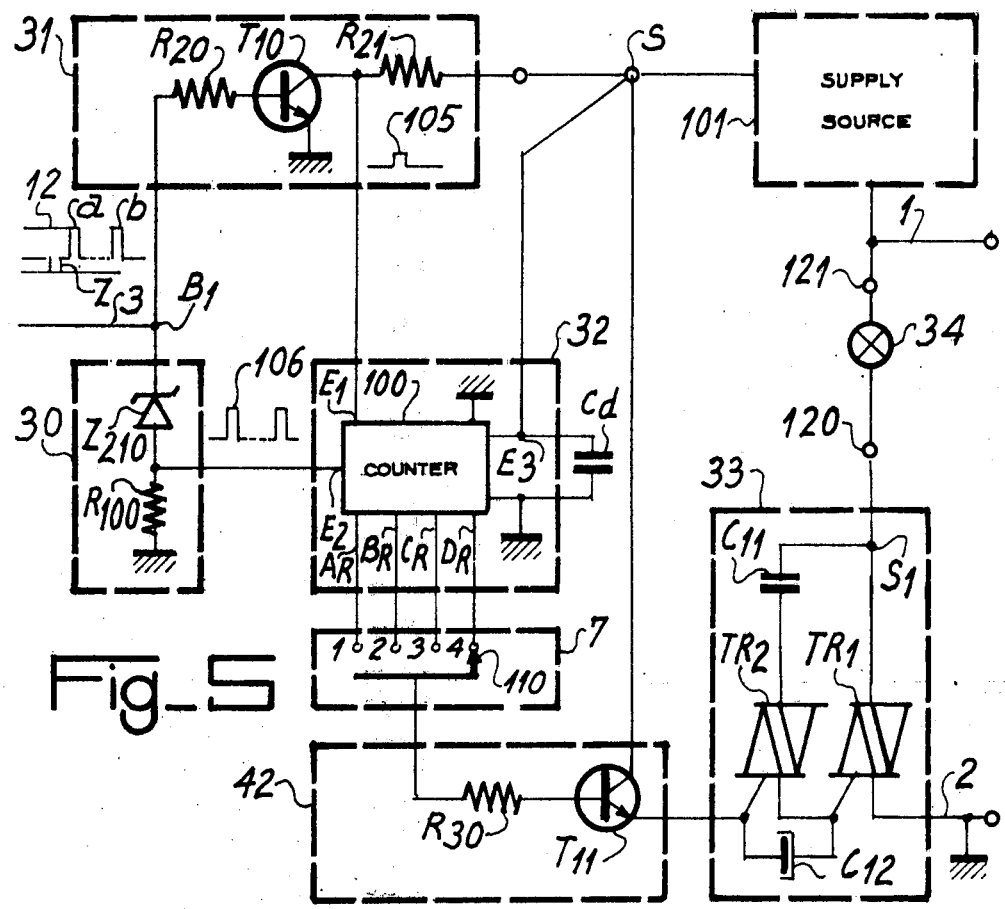
Fig_5
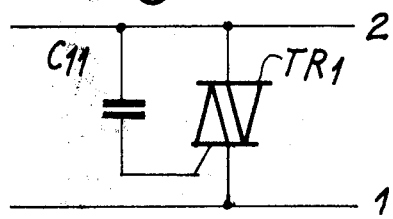
Fig_6
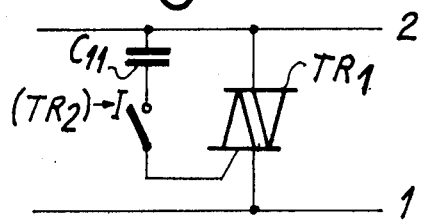
Fig_7

ELECTRONICALLY CONTROLLED POWER SUPPLY RAIL

This invention relates to an electronically controlled power supply rail intended for installations comprising a plurality of electrical equipment which are to be supplied independently of one another and this result being achieved by means of only three conductors.

Power supply rails used hitherto, in particular in the lighting field, generally have two or four conductors. They are controlled by means of switches positioned at their ends. In the case of a two conductor rail, loads on a single channel are fed from the mains distribution network. In the case of a four conductor rail the conductors are connected to the neutral, and to one phase or to all three phases of a three-phase mains distribution network and they are able to supply loads on only three independent channels. In order to increase the number of channels capable of being supplied by one and the same rail, it is necessary to increase the number of conductors. Moreover, all the conductors used in rails of this kind have to be of a cross-section appropriate to the power drawn by the loads, that is to say a considerable cross-section.

The present invention has as an object to an electronically controlled power supply rail having only three conductors of which one, termed a control conductor, may be of negligible cross-section. Such a rail is capable, simply with its three conductors, of providing a supply for loads on four (in the preferred embodiment) or more different channels, independently of one another.

The invention will be better understood from the following explanation and from the a accompanying Figures, in which:

FIG. 1 is a schematic view of an embodiment of an installation which makes use of an electronically controlled rail according to the invention, FIGS. 2 and 3 are block diagrams, respectively of a transmitter and a receiver, FIGS. 4 and 5 are diagrammatic views of embodiments of respectively a transmitter and a receiver, FIGS. 6 and 7 are explanatory Figures.

For greater clarity, the same items bear the same reference numerals in all the Figures.

An example of an installation which uses an electronically controlled supply rail according to the invention is shown in FIG. 1. The installation is a lighting installation, with each of the channels $L_1$, $L_2$, $L_3$, $L_4$ including a set of lamps which form a load. The load could for example consist of electric motors. Similarly, although the example features four utilisation channels $L_1$, $L_2$, $L_3$, $L_4$, with a rail according to the invention it is also possible to supply a greater number (n) of channels without increasing the number of conductors, simply by duplicating the electronic components, as will explained below. The n utilisation channels connected in parallel form a group and, a plurality of groups may be connected, in turn, and in parallel, to one and the same rail according to the invention. The rail is made up of three principal parts namely: the rail 111 proper having three conductors 1, 2 and 3, a transmitter 4 positioned at the end of the rail, which, is controlled by a control unit 5, and a plurality of receivers $R_1$, $R_2$, $R_3$, $R_4$ associated with each of the utilisation channels $L_1$, $L_2$, $L_3$, $L_4$. In the embodiment being described, n is equal to 4. Instructions are given to the transmitter 4 by means of the control unit 5 which is formed by a number (n) of switching members (breaker switches for example) equal to the number of utilisation channels whose loads are connected in parallel in each of the groups. Corresponding to these instructions is a predetermined control signal emitter by the transmitter 4 and transmitted by the third conductor 3 which is a control conductor to the plurality of receivers $R_1$, $R_2$, $R_3$, $R_4$. Each of said receivers includes a channel selecting systems 7 each formed by a set of (n) terminals marked 1, 2, 3, 4 equal in number to the (n) of utilisation channels, over which a movable contact 110 (symbolised by an arrow in the Figure) may be moved. This contact is set to position 1, 2, 3 or 4 or, in general terms, to a serial position x (x ranging from 1 to n), depending upon whether it is desired to supply channel $L_1$, channel $L_2$, channel $L_3$, or channel $L_4$ or, in general terms, the channel in serial position x. The first and second conductors 1 and 2 are connected to one phase and the neutral respectively of a mains distribution network and transmit power to the various loads on the utilisation channels $L_1$, $L_2$, $L_3$, $L_4$ whenever the appropriate receivers $R_1$, $R_2$, $R_3$, $R_4$, under the influence of the control signal supplied by the transmitter, causes voltage to be applied to the load on the utilisation channel in question. The receivers in fact receive control signals formed by a predetermined number of pulses depending on the instructions given to the control unit 5. Each receiver is adapted to react to one specific control signal and, as a function of this control signal, to provide a supply for the load with which it is associated. For example if it has been decided to light all the loads on channel $L_1$ (the channel in serial position $x=1$) and only these, the breaker switch in serial position x, i.e. $I_L$ (1), in the control unit 5 is therefore actuated and this causes the transmitter 4 to emit a control signal which is received by all the receivers. However, only the receivers $R_1$ whose contact terminal 1 (in serial position x) of the selecting system 7 is set to a so-called "closed" state (see the positions of the arrows) are able to transmit a triggering signal capable of applying voltage to the loads on channels $L_1$.

The same is true of each of the breaker switches in serial position x in the control unit 5, to which, in at least one of the selecting systems, corresponds a terminal in serial position x which is also set to the "closed" position, and this causes voltage to be applied to (or cut off from) the loads on the channel in serial position x, by triggering in the receiver concerned a power switching member such as a triac for example.

The train of pulses is preferably transmitted at a specific point in the period, to be more exact at time $\pi$. In this way the triacs concerned are triggered at zero voltage, the effect of which is to prevent any radio-electrical interference from being produced.

FIG. 2 is a block diagram of a transmitter as illustrated in FIG. 1 which is positioned at the end of a rail according to the invention. The control instructions, which are instructions for the coded state of a bidirectional counter supplied by the switches $I_L$ (1), $I_L$ (2), $I_L$ (3), $I_L$ (4) in the control unit 5, are applied to the inputs $A_1$, $B_1$, $C_1$, $D_1$, respectively of the transmitter 4. The latter converts them into a train of pulses by means, principally, of a counting circuit 10 (a bidirectional counter) which is responsible for starting and stopping the pulses supplied by a clock 13. The pulse train so obtained, which is termed an "intermediate signal," is transmitted to a shaping circuit 11 which emits a control signal 12, which in turn is transmitted to the receivers (not shown in FIG. 2) by the control conductor 3. This control signal contains a predetermined number of pulses a, b, c . . . , as stated above, and a so called "zero reset" pulse (Z). A synchronising system 15 receives at its input, across the terminals 20 and 21 connected to conductors 1 and 2, the supply voltage provided by the mains and is responsible for synchronising the control signal with the mains, as already explained above, with the object of preventing interference from occurring.

FIG. 3 is a block diagram of a receiver which cooperates with the transmitter described above. All the receivers contain the same means arranged in the same fashion and only certain settings differ, such for example as the position of the closed connections at terminals 1, 2, 3, 4. Such a receiver comprises a pulse separating stage 30, a reset (or zeroing) circuit 31, a counting circuit 32, a channel selecting system 7, a current amplifying stage 42, and a power switching stage 33 which is responsible for feeding voltage to a load 34 on one of the channels $L_1$, $L_2$, $L_3$, $L_4$. The operation of the receiver is described below. Each control signal 12, formed by a train of pulses a, b, c, . . . , which is transmitted by means of the control conductor 3 (which may be of small cross-section) to the receiver, is preceded by a pulse (Z) of a so-called zero resetting amplitude. Via the reset circuit 31, this pulse is used to reset to zero a counter in the counting circuit 32 before a train of pulses is transmitted which will serve to set the outputs of the counter to a predetermined state. In the control signal 12 which reaches the receiver, which signal is of the form indicated above, it is necessary to separate the pulses a, b, c . . . which are used to set the counter from the zero reset pulse (Z). This is achieved by means of the pulse separating stage 30 which is formed by a Zener diode (Zr) and a load resistor. This stage emits a useful signal which is applied in turn to the input of the counting circuit 32 whose function is to convert the useful signal into "1" or "0" logic signals, which are received at the output terminals $A_R$, $B_R$, $C_R$, $D_R$ of the counting circuit 32 and which form a so-called triggering signal. If reference is again made to the embodiment shown in FIG. 1, in which as is shown, the respective positions of the arrows indicate the positions of the moving contacts of the selecting systems 7, the terminal 1 (x=1) is connected to output $A_R$ of receiver $R_1$, terminal 2 (x=2) is connected to the output $B_R$ of receiver $R_2$, terminal 3 (x=3) is connected to output $C_R$ of receiver $R_3$, and terminal 4 (x=4) is connected to output $D_R$ of receiver $R_4$. Assuming that voltage is to be applied only to the channel in serial position 4, i.e. $L_4$, which is associated with receiver $R_4$, in this case the counting circuit 32 belonging to this receiver is adjusted to convert the useful signal in such a way that a "1" state appears at the output $D_R$ of the counting circuit, which output is connected to the terminal in serial position 4 of the selecting system 7 (see FIG. 1). Conversely, the counting circuits 32 of the other receivers $R_1$, $R_2$, $R_3$ are adjusted to convert the useful signal in such a way that a logic "0" state appears at outputs $A_R$, $B_R$, and $C_R$. The consequence of this, is that only the triggering signal obtained from output $D_R$ of the counting circuit 32 of receiver $R_4$ (in the example selected) is amplified in amplifier 42 before actuating a power switching stage 33 which is responsible for supply the load 34 on the channel $L_4$ which has been selected as the only one to receive a supply. The loads on channels $L_1$, $L_2$, $L_3$ remain without a supply. This manner of operation, allowing for the appropriate adjustments, is the same for each combination of transmitter, conductor, receiver and utilisation channel in a given serial position.

FIG. 4 is a schematic view of an embodiment of transmitter as described above with reference to FIGS. 1 and 2. As has already been mentioned above, the principal function of the transmitter is to transmit to the receiver a number of pulses which is determined by the channels $L_1$, $L_2$, $L_3$, $L_4$ which are to be supplied. In FIG. 4 the blocks corresponding to those which are shown in FIGS. 1 and 2 are represented by rectangles drawn in broken lines. Thus, again present are the synchronising system 15, the counting circuit 10, a clock 13, a control unit 5, and a shaping circuit 11 which emits a control signal 12 which is transmitted to the receiver $R_1$–$R_4$ by the control line 3. The synchronising system 15 is formed by a circuit formed by a resistor $R_1$, a Zener diode $Zr_1$, a transistor $T_1$ and a logic gate $P_1$. The resistor $R_1$ and the Zener diode $Zr_1$ are connected in series to the terminals 20 and 21 of the 220 volt mains supply. The common point of resistor $R_1$ and Zener diode $Zr_1$ is connected via a resistor $R_2$ to the base of transistor $T_1$, which is common emitter connected. The collector of transistor $T_1$ is connected via a resistor $R_3$ to a positive biasing source 50. The collector of transistor $T_1$ is also connected to the input of logic gate $P_1$, whose output is in turn connected to the triggering input of a monostable device 51 which emits, from its first and second outputs respectively, square-wave pulses 52 and 53 of a few microseconds duration each time the mains voltage passes through $\pi$. The negative-going pulse 52 which is obtained from the first output of monostable device 51 is applied to a bi-directional binary counter 54 and enables it to be preset to a state coded by the switches $I_L(1)$, $I_L(2)$, $I_L(3)$, $I_L(4)$ which correspond to the items of data applied at $A_1$, $B_1$, $C_1$ and $D_1$. The positive pulse 53 obtained from the second output of monostable flip-flop 51 is transmitted, via a capacitor 55 and a bridge consisting of resistors $R_4$ and $R_5$ which is connected between earth and the positive biasing source 50, to a two-input bistable flip-flop formed by two logic gates $P_2$ and $P_3$. This positive-going pulse causes the latter to change over at its decaying edge, the effect of which is to cause the output of gate $P_3$, which is initially at the "1" level, to change over to the "0" level. As a result the clock 13 is started, this clock being formed by two monostable devices 60 and 61 connected in cascade which emit pulses at a frequency of approximately 10 KHz. The pulses are conveyed to the backward counting input of the bidirectional counter 54, which begins to count down from the data applied at $A_1$, $B_1$, $C_1$, $D_1$ and which, at the passage through zero (after n pulses), emits a negative going pulse which causes the bistable arrangement formed by the two gates $P_2$ and $P_3$ to change over again and thus stops the clock. The counting out of the pulses is performed by means of the preset counter formed by circuit 54 and by means of the three gates $P_2$, $P_3$, $P_4$. One of the inputs of the latter gate $P_4$ is connected to the point A common to the output of the clock and to the backward counting input of circuit 54. The coding is performed, for example, by means of the four switches $I_L(1)$, $I_L(2)$, $I_L(3)$, $I_L(4)$ and four resistors $R_5$, $R_6$, $R_7$, $R_8$. The train of pulses termed the "intermediate signal" which is thus delivered by the clock is then conveyed via gate $P_4$ to the shaping circuit 11. The latter is formed by three transistors $T_2$, $T_3$, $T_4$. The intermediate signal is applied via a resistor $R_9$ to the base of transistor $T_2$, whose emitter is connected to earth via a resistor $R_{10}$. The collector of this transistor is connected both to a positive biasing source 65 by a resistor $R_{11}$ and to the base of transistor $T_4$. The collector of transistor $T_4$ is connected to source 65 while its emitter is connected both to earth via a resistor and to the control conductor 3 which is responsible for transmitting the control signal 12 to the receiver (not shown in this Figure). The initial pulse train formed at the output of gate $P_4$ is adjusted by a few volts, for example 2 volts, by means of transistor $T_2$ and the divider bridge formed by the two resistors $R_{10}$ and $R_{11}$ connected in its collector/emitter circuit. The zero reset pulse (Z) is obtained by means of transistor $T_3$. The base of the latter is connected via a resistor $R_{12}$ to the second output of monostable device 51 which emits the positive-going square wave signal 53. The collector of transistor $T_3$ is connected to the common point B at the base of transistor $T_4$ and the collector of transistor $T_2$, while its emitter is connected to earth. Signal 53 is delivered in each period at the passage through $\pi$, which enables the receiver to be reset at regular intervals, that is to say to be cycled. The purpose of this cycling is to nullify the effect of interference pulses which might affect the switching on and off of the loads on channels $L_1$, $L_2$, $L_3$ or $L_4$.

FIG. 5 is a schematic view of an embodiment of a receiver which cooperates with the other items making up an electronically controlled rail according to the invention. As in the case of the transmitter, the components making up the blocks shown in FIG. 3 are contained in rectangles drawn in broken lines.

Each control signal 12 formed by a train of pulses a, b, c . . . which is transmitted to the receiver by the control conductor 3 is preceded, as already stated above, by a pulse (Z) whose amplitude is, for example, between two volts and zero. This pulse is used via circuit 31, to reset to zero the counter 100 in the counting circuit 32. The reset circuit 31 is formed by a transistor $T_{10}$. The control signal 12 is applied via a resistor $R_{20}$ to the base of transistor $T_{10}$, whose collector is connected on the one hand via a resistor $R_{21}$ to the output S of a supply source 101 which in turn is connected to the mains, and on the other hand to a first input (E1) of the counter 100 which receives a pulse 105. In the control signal 12 received by the receiver, it is necessary to separate the train of n pulses (a, b, c . . . n) which are used to set the counter 100 from the pulse (Z). The pulse separator 30 performs this function. It is formed by a Zener diode $Z_{210}$ and a resistor $R_{100}$ which are connected in series between earth and resistor $R_{20}$. The signal is applied to the point $B_1$ common to the Zener diode and resistor $R_{20}$. The useful signal 106 supplied by circuit 30 is applied to a second input (E2) of counter 100. A third input E3 is also connected to point S (the output of the supply block 101). The counting circuit is formed by counter 100 and a decoupling capacitor $C_d$. It enables the useful signal to be converted into a logic state which is applied to the four outputs $A_R$, $B_R$, $C_R$, $D_R$ of counter 100. The channel selecting system 7 has four contacts or terminals 1, 2, 3, 4 which are connected to output terminals $A_R$, $B_R$, $C_R$, $D_R$ respectively of the counter 100, and a sliding contact 110 which, as has already been described with reference to FIG. 1, may be coupled with the output terminals to close one contact whilst the others remain open. In the example being described it is terminal 4 which is involved, as indicated by the arrow. Thus, under these conditions it is channel $L_4$ which is selected to have voltage applied to it, to the exclusion of the other channels $L_1$, $L_2$ and $L_3$. A train of n, for example 8 pulses, i.e. 1,000 in binary, is transmitted to the receivers by the control conductor 3. The counter 100 is adjusted so that its outputs $A_R$, $B_R$, $C_R$ are in the "0" state and the output $D_R$ is in the "1" state after this triggering signal, which is transmitted via a current amplifying stage 42 to the power switching circuit 33, has passed. The triggering signal is applied via a resistor $R_{30}$ to the base of a transistor $T_{11}$. The collector of this transistor $T_{11}$ is connected to point S (the output of the supply 101) and its emitter is connected to the input to the power switching stage 33. The latter is formed by a combination of two triacs $TR_1$ and $TR_2$ which are responsible for opening or closing the circuit between the phase conductor 1 and the neutral conductor 2 of the mains distribution network, through the load 34 on the channel $L_4$ which is concerned in the example being described in detail. An electrolytic capacitor $C_{12}$ connects the two gates of triacs $TR_1$ and $TR_2$. Its purpose is to improve the firing angle. All the other receivers $R_1$, $R_2$, $R_3$ are arranged in the same way as receiver $R_4$, except for the position of the sliding contact, so that during the passage of the train of control pulses, the various outputs $A_R$, $B_R$, $C_R$ receive logic "1" and "0" signals a number of times in succession. The "1" states have a tendency to unblock transistor $T_{11}$ and consequently to actuate the power switching stage of the receivers concerned. This is a disadvantage which must be avoided and the combination of the two triacs $TR_1$ and $TR_2$ enables this object to be achieved. If only triac $TR_1$ were fitted, with its anode and its cathode connected to the phase and the neutral of the mains supply and its gate connected to the phase via a capacitor $C_{11}$, as shown in FIG. 6, the expression for the current i could be written:

$$i = c(dv/dt)$$

where v is voltage and t is time.

By making the value of the capacitance of capacitor $C_{11}$ sufficiently high, it is possible to ensure that triac $TR_1$ is triggered only in the first and third quadrants. To stop triac $TR_1$ from conducting, it is merely necessary to open circuit to $C_{11}$ (FIG. 7). Triac $TR_2$ is responsible for performing this cut-off; it acts as a switch I (FIG. 7). This triac is selected from the range of sensitive triacs whose maximum gate current varies between 3 and 5 mA depending upon the quadrant. Since the triggering current for triac $TR_2$ is very small, as also is its range of variation, this enables the base resistor $R_{30}$ of transistor $T_{11}$ to be of a high value, the effect of which is to cancel out the deleterious effect of the passages through the "1" and "0" states of the outputs which correspond to loads which are not to be supplied. The fact of using two triacs as a static power switch also enables triac $TR_1$ to be of a conventional kind which triggers in the second and third quadrants and whose cut-off power may be selected as a function of the load without thereby affecting the circuits situated upstream.

Counter 100 is selected from the range of counters which enable the receiver to have a high input impedance (for example $R_{100}$ equal to 100 Kohms). Under these conditions, the use of a very large number of receivers connected in parallel may be envisaged without the transmitter thereby having to supply a considerable current. The counter 100 which is selected preferably has a low consumption, a high level of immunity to interference and is of small size, an example of this being the components which contain two counters in the same housing. This is the case with the embodiment described. The counter in question is a double binary counter of which four outputs are used. If it is desired to control eight channels rather than four it is merely necessary to wire the second counter in cascade with the first and to modify the counting circuit of the emitter accordingly so that it emits a number of pulses between 0 and 31. If it is desired to control a number of channels greater than eight, the number of pulses supplied by the counting circuit of the transmitter may be increased above thirty-one and a second counter 100 may be added to the receiver.

The supply block 101 is a conventional simplified supply which preferably supplies at its output (S) approximately 13 volts and approximately 30 mA. Its presence in each receiver enables the latter to be self-contained from the point of view of the supply to its active components, which makes it possible to use a large number of receivers connected in parallel.

The loads on the various channels may be of any kind. They may be lamps, motors, etc. Finally the control unit 5, which has been described as being formed by breaker switches, may be automatically actuated and in this way it is possible to produce display sequences which are particularly useful in, for example, the field of advertising lighting.

What is claimed is:

1. An electronically controlled power supply rail for supplying power from a supply source to selected ones of a plurality of loads, each connected to a respective one of a plurality n of utilisation channels, comprising:
  a first conductor and a second conductor for transmitting power;
  a bus for transmitting signals indicative of selected loads, said bus consisting of one third conductor providing a first control signal;
  a control unit having a plurality n of switches for supplying a second control signal;
  a transmitter positioned at one end of said rail and responsive to said second control signal; said transmitter comprising:
    a counting circuit which receives at its inputs said second control signal from the control unit and which, as a function of said second control signal, emits an intermediate signal, said counting circuit cooperating with a synchronising system for triggering the intermediate signal at a predetermined moment, and
    a shaping circuit receiving the intermediate signal and converting said intermediate signal into said first control signal formed by a train of pulses (a), (b), (c) . . . and a zero reset pulse (Z), transmitted to said plurality of receivers by means of said third conductor;
  a plurality of receivers, each of said receivers having first, second and third inputs respectively connected to said first, second and third conductors and having a first output connected to an associated one of said utilisation channels and a second output having n terminals connected to an associated channel selecting system having a movable contact for selecting one of said terminals in accordance with the utilisation channel which is to be supplied; and each of said receivers comprising a power switching member and means for performing a cycling operation during each period of said supply source; said selecting system, said power switching member and said cycling operation performing means cooperating with one another to cause, as a function of said control signal received by said plurality of receivers via said transmitter, voltage to be applied to the load of the utilisation channel which is associated with the receiver which is connected to said associated selecting system having said movable contact set to the said one selected terminal.

2. Electronically controlled power supply rail according to claim 1 wherein said second triac prevents the unwanted operation of said first triac under the effect of pulses not belonging to the triggering signal.

3. An electronically controlled power supply rail for supplying power from a supply source to selected ones of a plurality of loads, each connected to a respective one of a plurality n of utilisation channels, comprising:
  a first conductor and a second conductor for transmitting power;
  a bus for transmitting signals indicative of selected loads, said bus consisting of one third conductor providing a first control signal;
  a control unit having a plurality n of switches for supplying a second control signal;
  a transmitter positioned at one end of said rail and responsive to said second control signal;
  a plurality of receivers, each of said receivers having first, second and third inputs respectively connected to said first, second and third conductors and having a first output connected to an associated one of said utilisation channels and a second output having n terminals connected to an associated channel selecting system, said selecting system having a movable contact for selecting one of said terminals in accordance with the utilisation channel which is to be supplied; and each of said receivers comprising a power switching member and means for performing a cycling operation during each period of said supply source; said selecting system, said power switching member and said cycling operation performing means cooperating with one another to cause, as a function of said control signal received by said plurality of receivers via said transmitter, voltage to be applied to the load of the utilisation channel which is associated with the receiver which is connected to said associated selecting system having said movable contact set to the said one selected terminal;
  wherein each of said plurality of receivers comprises a pluse separating circuit capable of eliminating a zero reset pulse (Z) transmitted by said transmitter and of delivering a useful signal; and a counting circuit converting said useful signal into a succession of logic "0" and "1" states for obtaining a triggering signal capable of actuating said power switching member; and
  wherein said triggering signal is applied to the base of a first transistor through a resistance, the collector of said first transistor being connected to a point common to the output of a supply source, the emitter of said first transistor being connected to the input of a power switching stage comprising a combination of first and second triacs.

4. An electronically controlled power supply rail system for selectively providing power to respective ones of a plurality n of utilisation channels, each of said utilisation channels being connected to a load for providing power to said load, said system comprising:

a neutral conductor, a first conductor for carrying power, and a bus for carrying signals for selecting one of said utilisation channels, said bus consisting of one second conductor;

a first control unit for selecting among said utilisation channels;

a transmitter responsive to the output of said first control circuit for providing a control signal to said second conductor; said transmitter comprising:
- a synchronizing system for providing concurrent first and second synchronizing pulses, said synchronizing system being adapted to receive power from an alternating current source and generating said first and second synchronizing pulses in response thereto;
- a clock circuit for providing timing pulses;
- a counting circuit responsive to the output of said first control unit and to the output of said clock circuit, and to said first synchronizing pulse, for generating control pulses indicative of a selected one of said utilization channels;
- a shaping circuit responsive to said second synchronizing pulse and to the output of said counting circuit for obtaining a reset pulse and combining said reset pulse and said control pulses to form said control signal having a specific predetermined sequence of at least one pulse indicative of said selected utilization channel;

a plurality of second control units; and a plurality of receivers, each of said receivers connected to said reference conductor, said first conductor, said second conductor, an associated one of said second control units, and an associated one of said utilisation channels, and thereby to a preselected one of said loads; wherein each of said receivers is responsive to the setting of said associated second control unit to provide power to said associated utilisation channel when said control signal contains a specific predetermined sequence of at least one pulse.

5. The system as in claim 4 wherein said first control unit comprises a plurality of switches, said switches being set to indicate a selected one of said utilization channels, and said counting circuit having an initial value determined by said first control unit, said initial value being counted down to zero in response to said timing pulses, thereby generating a number of control pulses indicative of said value.

6. The system as in claim 5 wherein said switches are automatically set.

7. The system as in claim 6 wherein each of said receivers comprises:
- a reset circuit responsive to said reset pulse of said control signal;
- a pulse filter stage for removing said reset pulse from said control signal and providing said control pulses at the output thereof;
- a counting circuit responsive to the output of said reset circuit for resetting a pulse count and responsive to the output of said pulse filter for counting the number of pulses following said reset pulse and preceding a subsequent reset pulse, said counting circuit having a plurality n of output terminals, the number n corresponding to the number of utilization channels, and each of said terminals having a logical state determined by the said number of pulses counted; and
- a switching stage for controllably supplying power to said associated utilization channel and thereby to said associated load; said associated second control unit being connected to said output terminals and connecting a selected one of said output terminals to said switching stage in accordance with a predetermined designation of said associated utilization channel, said associated receiver being responsive to said control signal when a specific predetermined sequence of at least one pulse indicative of said predetermined designation occurs therein.

8. The system as in claim 7 wherein said switching stage comprises an amplifying stage responsive to the output of said associated second control unit, and a power switching stage responsive to the output of said amplifying stage for controllably supplying power to said associated utilization channel, said power switching stage comprising a first triac for controllably supplying power to said associated utilization circuit, said first triac having the control gate thereof connected to a second triac, said second triac having the gate thereof cooperating with said amplifying circuit to cause said switching stage to be unresponsive to the output of said associated second control unit while said counting circuit is counting the number of pulses, and being responsive to a signal provided at the output of said associated second control unit when said counting is completed.

9. An electronic controlled power supply rail system for selectively supplying power to a plurality of loads comprising:
- means for indicating a selected one of said loads;
- means for generating clock pulses;
- means for generating synchronizing pulses;
- means responsive to said synchronizing pulses to initiate and defeat operation of said clock means, and responsive to the output of said clock means and said selecting means to generate control pulses in accordance with the setting of said selecting means;
- means for generating a control signal, said control signal generating means responsive to the output of said synchronizing means and to the output of said counting means for providing a composite signal having a reset pulse and control pulses indicative of the selected one of said loads;
- a first neutral conductor;
- a second conductor for carrying an operating voltage;
- a third conductor for transmitting said control signal; and
- a plurality of receiving means and designating means, each of said receiving means being associated with a predetermined one of said designating means and a predetermined one of said loads and connected to said first, second, and third conductors, said associated designating means being indicative of said associated load and said receiving means being responsive to said control signal in accordance with said associated designating means, said receiving means comprising:
  - counting means having a plurality of terminals, each of said terminals corresponding to a respective one of said loads, for providing a signal on a selected one of said terminals in accordance with the number of said control pulses in said command signal;
  - means responsive to said reset pulse of said control signal for preparing said counting means to receive said control pulses;
  - means responsive to said control signal for providing said control pulses to said counting means; and
  - means for controlling the supply of power to said load, said controlling means being connected to a predetermined one of said terminals in accordance with said designating means and responsive thereto.

* * * * *